US009692233B2

(12) United States Patent
Becker et al.

(10) Patent No.: US 9,692,233 B2
(45) Date of Patent: *Jun. 27, 2017

(54) METHOD FOR CONTROLLING AN ENERGY STORAGE SYSTEM

(71) Applicant: Panasonic Intellectual Property Management Co., Ltd., Osaka (JP)

(72) Inventors: Ralf Becker, Neu-Isenburg (DE); Marc Neubert, Ober-Ramstadt (DE); Paul James, Erzhausen (DE)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/080,819

(22) Filed: Mar. 25, 2016

(65) Prior Publication Data

US 2016/0211668 A1 Jul. 21, 2016

Related U.S. Application Data

(63) Continuation of application No. 14/344,410, filed as application No. PCT/JP2013/004394 on Jul. 18, 2013, now Pat. No. 9,331,511.

(30) Foreign Application Priority Data

Jul. 20, 2012 (EP) .................................. 12177247

(51) Int. Cl.
*H01M 10/44* (2006.01)
*H01M 10/46* (2006.01)
(Continued)

(52) U.S. Cl.
CPC ............... *H02J 3/32* (2013.01); *G05B 15/02* (2013.01); *H02J 7/007* (2013.01)

(58) Field of Classification Search
CPC ...... H02J 7/0013; H02J 7/1423; H02J 7/0003; H02J 7/0024; H02J 7/0055; H02J 7/007
(Continued)

(56) References Cited

U.S. PATENT DOCUMENTS 7,957,846 B2 6/2011 Hakim et al.
8,008,804 B2 8/2011 Capp et al.
(Continued)

FOREIGN PATENT DOCUMENTS

EP 2 190 097 5/2010
JP 9-37463 2/1997
(Continued)

OTHER PUBLICATIONS

International Search Report issued Oct. 8, 2013 in International Application No. PCT/JP2013/004394.
(Continued)

*Primary Examiner* — Edward Tso
(74) *Attorney, Agent, or Firm* — Wenderoth, Lind & Ponack, L.L.P.

(57) ABSTRACT

A method for controlling an energy storage system. The same battery system shall support multiple services at the same time. During a planning phase, the multiple services to be provided are determined, based on the market situation and the capabilities of the energy storage system, and prioritized according to predefined criteria. During an operation phase, the power and energy status of the energy storage system is periodically monitored, and compared against the power and energy demands of the multiple services, in order to determine whether at each time instance, the multiple services can indeed be supported at the same time. In case power and/or energy limits are exceeded by the multiple services, at least one service is interrupted to allow the operation of the energy storage system to be within power/
(Continued)

energy limits again. The interrupted service(s) is resumed when the power/energy limits are met.

15 Claims, 11 Drawing Sheets

(51) Int. Cl.
*H02J 3/32* (2006.01)
*G05B 15/02* (2006.01)
*H02J 7/00* (2006.01)

(58) Field of Classification Search
USPC ......... 320/103, 110, 126, 136, 138; 705/1.1, 705/400
See application file for complete search history.

(56) References Cited

U.S. PATENT DOCUMENTS

| | | | |
|---|---|---|---|
| 8,080,898 B2 | 12/2011 | Fukuhara | |
| 9,331,511 B2* | 5/2016 | Becker | H02J 3/32 |
| 2010/0090532 A1 | 4/2010 | Shelton et al. | |
| 2011/0140667 A1 | 6/2011 | Moon | |
| 2012/0105003 A1 | 5/2012 | Laughner | |
| 2012/0227926 A1* | 9/2012 | Field | F24D 11/003 165/10 |
| 2012/0233094 A1 | 9/2012 | Mise et al. | |
| 2012/0316691 A1* | 12/2012 | Boardman | H02J 3/26 700/293 |
| 2013/0179061 A1 | 7/2013 | Gadh et al. | |

FOREIGN PATENT DOCUMENTS

| | | |
|---|---|---|
| JP | 2003-284244 | 10/2003 |
| JP | 2011-78238 | 4/2011 |
| JP | 2012-55027 | 3/2012 |

OTHER PUBLICATIONS

Written Opinion of the International Searching Authority issued Oct. 8, 2013 in International Application No. PCT/JP2013/004394.
Alexandre Oudalov et al., "Optimizing a Battery Energy Storage System for Primary Frequency Control", IEEE Transaction on Power Systems, vol. 22, No. 3, Aug. 2007.
Philipp Braun et al., "Optimizing a Hybrid Energy Storage System for a Virtual Power Plant for Improved Wind Power Generation: A Case Study for Denmark", IRES conference, Berlin, 2011.
"AES Wind Generation and AES Energy storage announce commercial operation of Laurel Mountain wind facility combining energy storage and wind generation", http://www.aesenergystorage.com, Press release: Oct. 27, 2011.
Extended European Search Report issued on Nov. 9, 2012 in European Patent Application No. 12177247.9 which is the priority application of the present application.
Cornelius Pieper et al., "Revisiting Energy Storage", The Boston Consulting Group, Feb. 2011.
Jim Eyer et al., "Energy Storage for the Electricity Grid: Benefits and Market Potential Assessment Guide", Sandia National Laboratories, Feb. 2010.
"Operational Reserve Ad Hoc Team Report Final Version", European Network of Transmission System Operators for Electricity, May 2012.

\* cited by examiner

METHOD FOR CONTROLLING AN ENERGY STORAGE SYSTEM

TECHNICAL FIELD

The present invention relates to a method for controlling an energy storage system.

BACKGROUND ART

The electricity infrastructure allows transferring electricity from supply sources (generation or electricity storage) to distribution systems and ultimately to the end users. The system currently undergoes considerable change with the strong growth in fluctuating renewable energy generation such as wind and photovoltaic energy. Furthermore, continuing load growth and increasing regional power transfer in interconnected networks lead to a stressed and less secure power system operation in general.

Large-scale electricity storage systems coupled to the power generation may become vital to compensate for the fluctuation of power output in connection with such renewable energies and to deal with the additional requirements imposed on the system. Thus, electricity storage systems are to become an important element of the electricity infrastructure of the future.

There are various types of electricity storage systems such as electrochemical batteries, flow batteries, capacitors, compressed air energy storage (CAES), Flywheel Energy Storage, Pumped Hydroelectric, Superconducting Magnetic Energy Storage (SMES) or Thermal Energy Storage. Familiar battery technologies include lead-acid, nickel-cadmium (NiCad), lithium-ion (Li-Ion), natrium/sulfur (NA/S), zinc/bromine (Zn/Br), Vanadium Redox Flow (VRF) and others.

These Electricity Storage Systems can also be categorized into High energy capacity (e.g. VRF, Na/S) and High power rating (flywheel, lead acid, Li-Ion). High energy capacity storage system is designed to provide a power over long period of time e.g hours/day. Whereas high power rating storage systems are designed to provide higher power over a short period of time e.g. minutes/hour.

Generally commercial available battery energy storage systems have a similar layout. Batteries are connected to a power conditioning unit (PCU) which converts a variable DC voltage of the battery to a three-phase AC voltage. The generated AC voltage is often different to the grid voltage so that a transformer is needed to transmit power into the grid. In parallel to the battery energy storage system, a monitoring of the battery may be performed through a battery management unit (BMU). BMU controls battery specific parameters like state of charge, dis/charging process or temperature of the battery, as well as the PCU and connection to the electrical grid where power is supplied or received.

SUMMARY OF INVENTION

The present invention provides a method for controlling an energy storage system properly.

A method according to an aspect of the present invention is the method for controlling an energy storage system connected to an electric grid, the control method comprising: determining at least two different service methods according to which the energy storage system is to be operated; prioritizing the at least two different service methods with respect to each other based on at least one predefined criterion; operating the same energy storage system according to, in parallel, the at least two different service methods to provide, from the energy storage system to the electric grid, total power associated with the at least two different service methods; and, decreasing provision of low-priority power associated with at least one out of the at least two different service methods in an ascending order of priority to adjust the total power to a predefined power limits of the energy storage system, in case that the total power does not lie within the predefined power limits.

It is to be noted that general and specific aspects disclosed above may be implemented using a system, an apparatus, an integrated circuit, a computer program, or a non-transitory computer-readable recording medium such as a CD-ROM, or any combination of systems, apparatuses, methods, integrated circuits, computer programs, or recording media.

An energy storage system can be controlled properly.

DESCRIPTION OF EMBODIMENTS

Figure 1:
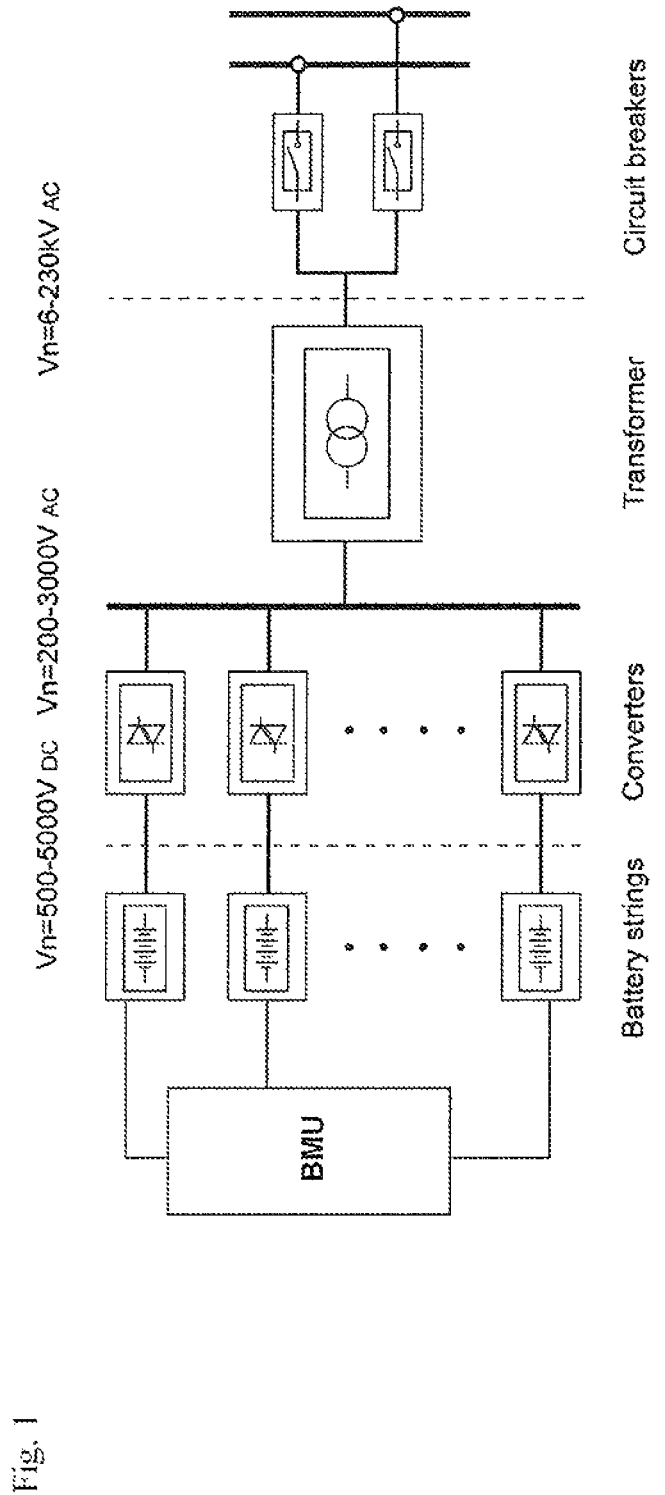
FIG. 1 shows an exemplary battery energy storage system.

In the following the embodiments and aspects of the invention are described in more detail under reference to the attached figures. Similar or corresponding details in the figures are marked with the same reference numerals.

(Underlying Knowledge Forming Basis of the Present Invention)

The inventors have found a problem in the electricity storage systems. The following describes the details.

A corresponding illustration of an exemplary battery energy storage system is given in FIG. 1.

Such electricity storage systems also allow the power generation system to provide a range of application or services in addition to the mere output of electricity. These application or services, also called ancillary services, will be described in more detail later.

When indicating the rating of an electricity storage system, the two main criteria to address are power and energy, while there are further criteria as well. Power indicates the rate at which the system can supply and receive energy, and the energy relates to the amount that can be supplied or received to an electric grid. The amount of energy stored determines the amount of time that the system can discharge at its rated power (output), hence the discharge duration.

A storage system's power rating is assumed to be the system's nameplate power rating under normal operating conditions. The normal discharge rate used may be commonly referred to as the system's 'design' or 'nominal' (power) rating.

During emergency cases storage system can discharge above the rated power, up to a maximum power. Maximum power can be defined as the possible maximum physical power which can be supplied or received from a storage system with possible damage to the battery storage system. Some types of storage systems can discharge at a relatively high rate (e.g., 1.5 to 2 times their nominal rating) for relatively short periods of time (e.g. several minutes to as much as 30 minutes). One example is storage systems involving an Na/S battery, which is capable of producing two times its rated (normal) output for relatively short durations.

That feature—often referred to as the equipment's 'emergency' rating—is valuable if there are circumstances that occur infrequently involving an urgent need for relatively high power output, for relatively short durations. Importantly, while discharging at the higher rate, storage efficiency is reduced (relative to efficiency during discharge at the nominal discharge rate) and storage equipment damage increases (compared to damage incurred at the normal discharge rate).

So, in simple terms, storage with emergency power capability could be used to provide the nominal amount of power required to serve a regularly occurring need (e.g., peak demand reduction) while the same storage could provide additional power for urgent needs that occur infrequently and that last for a few to several minutes at a time.

Discharge duration is the amount of time that storage can discharge at its rated output (power) without recharging. Discharge duration is an important criterion affecting the technical viability of a given storage system for a given application and storage plant cost.

All energy transfer and conversion processes have losses, and energy storage is no different. Storage system round-trip efficiency (efficiency) reflects the amount of energy that comes out of storage relative to the amount put into the storage. Typical values for efficiency include the following: 60% to 75% for conventional electrochemical batteries; 75% to 85% for advanced electrochemical batteries; 73% to 80% for CAES; 75% to 78% for pumped hydro; 80% to 90% for flywheel storage; and 95% for capacitors and SMES.

To one extent or another, most energy storage media degrade with use (i.e. during each charge/discharge cycle). The rate of degradation depends on the type of storage technology, operating conditions and other variables. This is especially important for electrochemical batteries. For some storage technologies—especially batteries—the extent to which the system is emptied (discharged) also affects the storage media's useful life. Discharging a small portion of stored energy is a 'shallow' discharge and discharging most or all of the stored energy is a 'deep' discharge. For these technologies, a shallow discharge is less damaging to the storage medium than a deep discharge.

Of course, there is usually a corresponding incremental cost for the superior performance. To the extent that the storage medium degrades and must be replaced during the expected useful life of the storage system, the cost for that replacement must be added to the variable operating cost of the storage system.

Like power rating and discharge duration, storage system reliability requirements are circumstance-specific. Little guidance is possible. The project design engineer is responsible for designing a plant that provides enough power and that is as reliable as necessary to serve the specific application.

Storage response time is the amount of time required to go from no discharge to full discharge. At one extreme, under almost all conditions, storage has to respond quite rapidly if used to provide capacity on the margin in lieu of electricity transmission and distribution capacity. That is because the output from equipment (i.e. wires and transformers) changes nearly instantaneously in response to demand. In contrast, considering storage used in lieu of generation capacity, that storage does not need to respond as quickly as the storage mentioned above because generation tends to respond relatively slowly to demand changes. Specifically, some types of generation—such as engines and combustion turbines—take several seconds to many minutes before generating at full output. For other generation types, such as those fuelled by coal and nuclear energy, the response time may be hours.

Most types of storage systems have a response time of several seconds or less. CAES and pumped hydroelectric storage tend to have a slower response because of system inertia response time. However, CAES and pumped hydroelectric storage have still a respond quickly enough to serve several important applications in the market which are different to the above-mentioned storage systems. In any case, the response time of an energy storage system is considerably less than the response time of the energy generation.

An important storage system characteristic for some applications is the ramp rate—the rate at which power output can change. Generally, storage ramp rates are rapid and within a second (i.e., output can change quite rapidly); CAES and pumped hydro are the exceptions because of large system inertia. Charge rate—the rate at which storage can be charged—is an important criterion because, often, modular energy storage (MES) must be recharged so it can serve load during the next day. If storage cannot recharge quickly enough, then it will not have enough energy to provide the necessary service. In most cases, storage charges at a rate that is similar to the rate at which it discharges. In some cases, storage may charge more rapidly or more slowly, depending on the capacity of the power conditioning equipment and the condition and/or chemistry and/or physics of the energy storage medium.

To one extent or another, most storage types require some type of power conditioning (i.e., conversion) subsystem. Equipment used for power conditioning—may be termed as the power conditioning unit (PCU)—modifies electricity so that the electricity has the necessary voltage and the necessary form; either alternating current (AC) or direct current (DC). The PCU, in concert with an included control system, must also synchronize storage output with the oscillations of AC power from the grid.

Ancillary services are an integral part of any well-functioning interconnected power system and can be built and operated in a very large variety of applications. There are various different services and new services will evolve in the future. Also, there is no agreed nomenclature for the various services, making it difficult to provide a consistent and complete overview of the services in connection with power systems and power grids. Correspondingly, the particular name of service shall be descriptive of the service but not exclusively.

"Revisiting Energy Storage—There is a Business Case" from The Boston Consulting Group by Cornelius Pieper and Holger Rubel and also "Energy Storage for the Electricity Grid: Benefits and Market Potential Assessment Guide, A Study for the DOE Energy Storage Systems Program", Sandia Report, by Jim Eyer and Garth Corey include an overview of services and their definitions.

In the following some important, but not all, services will be described in more detail. However, this should not be regarded as restricting the present application to only the following services. Rather, the following services shall be understood as examples of services that can be provided by an energy storage system and are mentioned in the above prior art or that will come into existence in the future.

(Energy Arbitration)

Energy arbitration, also known as Price Arbitrage or Electric Energy Time-Shift, refers in general to the leveraging of the price spread of electricity between peak and off-peak periods by storing energy when prices are low and discharging when prices are high. Put differently, this application tends to involve purchase of inexpensive energy from the wholesale electric energy market for storage charging. When the energy is discharged, it could be resold via the wholesale market, or it may offset the need to purchase wholesale energy and/or to generate energy to serve end users' needs.

Many renewable energy generation resources produce a significant portion of electric energy when that energy has a low financial value (e.g., at night, on weekends and during holidays)—generally referred to as off-peak times. Energy storage used in conjunction with renewable energy generation could be charged using low-value energy from the renewable energy generation so that energy may be used to offset other purchases or sold when it is more valuable.

For the time-shift application, the storage system discharge duration is determined based on the incremental benefit associated with being able to make additional buy-low/sell-high transactions during the year versus the incremental cost for additional energy storage (discharge duration).

Both storage (non-energy-related) variable operating cost and storage efficiency are especially important for this application because electric energy time-shift involves many possible transactions whose economic merit is based on the difference between the cost to purchase, store, and discharge energy (discharge cost) and the benefit derived when the energy is discharged. Any increase in variable operating cost or reduction of efficiency reduces the number of transactions for which the benefit exceeds the cost. That number of transactions is quite sensitive to the discharge cost, so a modest increase may reduce the number of viable transactions considerably.

Two performance characteristics that have a significant impact on storage variable operating cost are efficiency and the rate at which storage performance declines as it is used.

(Forecast Deviation)

Forecast Deviation, which may also be termed as Balancing Energy, because every imbalance which occurs during operation needs to be balanced. Forecast Deviation is basically used to compensate forecasting errors and improve the power supply into the energy market.

Forecast deviation provided by energy storage systems creates revenues by reducing the cost for balancing power because of a reduced mismatch between generation forecast and real production. Cost for balancing power can be declared as a penalty for renewable energies. In general, every party which operates consumption units or production plants have to predict their consumption or production.

Although, forecast deviation is mainly related to wind forecasting and trading, in general other circumstances influencing the generation of electricity (such as sudden technical failure of power plant) are to be accounted for too. The 24-36 hour wind forecast e.g. is used for day-ahead trading with an error of 10%, while the 4-6 hour wind forecast is used for intra-day trading with an error of 5%. Power delivery is accounted at end of each hour.

In order to compensate for such forecasting errors, an energy storage system offers flexibility by having sufficient reserves in the storage system while at the same time allowing to store excess energy—thus, achieve a positive balancing and negative balancing of energy. One characteristic of forecast deviation service is that a huge energy storage is usually necessary used for long time periods (days). On the other hand, the power provision is small compared to e.g. energy. This can be referred to the small forecasting error which can be about 5% of the traded power of the wind generator. Today's biggest wind generators have a maximum power output of about 5 MW. Only in maximum operation, the forecast deviation can be about 250 kW for a single wind generator. Furthermore, it can be concluded that the requirement for an energy storage system which provides forecast deviation service can be slow in reaction time. Wind generator power output changes occur over a timeline of several minutes up to 15 minutes. Only in cases where very high amounts of wind generators are coupled can produce system critical power gradients.

(Frequency Response)

Power generation and power demand in power grids do not match perfectly at all times. The power generation may fluctuate due to fluctuations inherent to e.g. some forms of renewable energy or due to sudden technical failures in the power generation system. Power demand may also suddenly increase or decrease. Because the ability of the power generator to follow such sudden load variations is typically much slower than the time period of the load variation, the electrical generation and distribution system is constantly challenged with a mismatch between the load and the power being generated. As is known in the art, when the electrical load exceeds the total power being generated, the system AC frequency drops. Alternatively, when the total power being generated exceeds the electrical load requirement, the frequency rises. Thus, the service of "Frequency Response" allows reacting on changes in grid frequency to compensate for a mismatch in supply and demand of electricity, and thus stabilize grid frequency at a defined level (e.g. Europe 50 Hz, USA 60 Hz).

Frequency Response is also known by the terms Primary Frequency Regulation, Primary Reserve, Primary Control Power, Balancing Power or Spinning Reserve.

The characteristics of this Frequency Response service is among others that it needs a short reaction time (within seconds), it is short in duration (e.g. within minutes), albeit requires a high power output and occurs always during a day because of described mismatch on generation and demand. However, frequency response is only activated in at a certain frequency deviation. This means according to ENTSO-E grid codes (European Network of Transmission System Operators for electricity) that the power system is defined as stable in a range of 50 Hz+/−20 mHz. Within this band no Frequency response need to be provided. Only at higher deviation frequency response is activated and need to be provided. On the other hand, the required energy capacity is small compared to Forecast Deviation.

(Peak Shift)

The service "Peak Shift" also known as Peak Shaving, aims to flatten peaks in the power generation and power consumption. In particular, in most markets the power tariff comprises a fixed component, determined by the maximum, or peak, power required at any point in time, and a variable component, which is the actual energy consumed. Exceeding the agree-upon maximum power can result in severe penalties, depending on the contract, and shaving the consumption peaks can significantly reduce the fixed component. When more load is needed than can be taken from the grid, according to the delivery contract, a battery serves as the temporary source of extra power in this application.

(Ramp Rate Reduction)

Existing storage facilities are frequently used for an application that is a core element of many energy markets today, and will be even more so in the near future: stabilizing power generation in order to make the best use of conventional and renewable generation. This can be accomplished by minimizing ramping (in the case of conventional power plants) and minimizing throttling (in the case of renewable power plants).

Any energy-generation system must be able to react flexibly to changes in load and generation. Some of this flexibility is provided by balancing energy, as described above with respect to the Frequency Response and Forecast Deviation services to smoothen power output of renewable generators. Longer fluctuations—lasting hours or days—can be easily accommodated by ramping conventional power generation up and down or by throttling peaks in renewable generation. Peak-load power plants are designed to ramp up and down quickly several times a day; older, conventional power plants are restricted in their ability to do so. In that case, energy storage systems can improve ramping capabilities and reduces stress of the equipment of the older systems.

(Energy Market)

This basic service refers to the ability to purchase and sell electricity at the Energy Market at need. For example, if not enough energy can be produced and the electricity storage system is not able to compensate for the missing energy, a corresponding amount of energy can be purchased through the Energy Market. Conversely, if too much energy is produced at the power generation side and the electricity storage system is not able to store the surplus energy, energy can be sold through the Energy Market to ensure the proper functioning of the power plant and storage system. Additionally, the Energy Market can be used to optimize state of charge of the energy storage system in such a way that wear and tear is reduced and a high life cycle is maintained.

(Load Following)

Load following capacity is characterized by power output that changes as frequently as every several minutes. The output changes in response to the changing balance between electric supply (primarily generation) and end user demand (load) within a specific region or area. Conventional generation-based load following resources' output increases to follow demand up as system load increases. Conversely, load following resources' output decreases to follow demand down as system load decreases. Typically, the amount of load following needed in the up direction (load following up) increases each day as load increases during the morning. In the night, the amount of load following needed in the down direction (load following down) increases as aggregate load on the grid drops.

(Area Regulation)

Area regulation is one of the ancillary services for which energy storage systems may be especially well-suited. Regulation involves managing interchange flows with other control areas to match closely the scheduled interchange flows and moment-to-moment variations in demand within the control area.

In more basic terms, regulation is used to reconcile momentary differences between supply and demand. That is, at any given moment, the amount of electric supply capacity that is operating may exceed or may be less than load. Regulation is used for damping of that difference. Regulation is typically provided by generating units that are online and ready to increase or decrease power as needed. When there is a momentary shortfall of electric supply capacity, output from regulation resources is increased to provide up regulation. Conversely, regulation resources' output is reduced to provide down regulation when there is a momentary excess of electric supply capacity.

(Other Services)

As mentioned above, there are various other services that will not be discussed in detail, such as Electric Supply Reserve Capacity, Voltage Support, Transmission Support, Transmission Congestion Relief, Transmission and Distribution Upgrade Deferral, Substation On-Site Power, Time-of-Use Energy Cost Management, Demand Charge Management, Electric Service Reliability, Renewables Capacity Firming, Provision of Black-Start Services, Residential Storage.

As relatively new technology, Electricity Storage Systems are very expensive and therefore it is challenging to operate them in an economic way. Currently, storage system management approaches operate the storage system according to the most-valuable service. Furthermore, in order to provide the two most-valuable services, two separate Electricity Storage Systems are used, each being operated according to one of the services, thus achieving a high reliability in providing each service; this however, at high costs.

Correspondingly, there is a need for an intelligent control strategy for controlling Energy Storage Systems.

Therefore, in view of the above, one object of the present invention is to provide a method for controlling a battery energy storage system overcoming the above-mentioned disadvantages of the prior art.

The object is solved by the subject matter of the independent claims. Advantageous embodiments are subject to the dependent claims.

One aspect of the invention is to maximize the utilization of the Electricity Storage System by operating the same Energy Storage System with multiple services in parallel, according to an algorithm that allows maintaining the constraints of the Energy Storage System.

Correspondingly, during a planning phase (set-up phase before actual operation), the multiple services to be provided by the storage system are to be determined. To said end, for example the services that may be traded at the market are evaluated, a suitable criterion for prioritization of the services between each other is calculated, and the services are prioritized based on the predefined criterion.

Furthermore, for example, the thus determined services are compared with the capabilities of the energy storage system, for each service separately and/or for the combination of the services. It may thus be already determined during the planning phase, whether the provision of the multiple services is likely to be fulfilled by the energy storage system or not.

During an operation phase, the energy storage system is operated according to all the services determined at the end of the planning phase at the same time. The power and energy status of the energy storage system is periodically monitored, in order to determine whether at each time instance, the multiple services can indeed be supported at the same time or not.

The energy storage system may be operated according to all services in parallel as long as the power and energy constraints of the energy storage system are met, i.e. when the monitoring of power and energy yields the result that energy content of the energy storage system is still high enough and that the total power demand of all services does not exceed a power limit predefined for the energy storage system.

In case power and/or energy limits are exceeded by the multiple services, at least one service is interrupted to allow the operation of the energy storage system to be within power/energy limits again. The interrupted service(s) is resumed when the power/energy limits are met.

In addition, or alternatively, instead of interrupting (i.e. stopping) the service, the power provided by the energy storage system of that at least (low priority) service is reduced, as much as necessary to be within the power limits. In each time instance where the power is monitored, this reduced power may be further reduced or increased again, depending on the power status of the energy storage system. Thus, the energy storage system can be operated always at its power limit.

The present invention provides a method for controlling a battery energy storage system connected to an electric grid, wherein said battery energy storage system is operated to supply and/or receive energy to/from the electric grid according to at least two different service methods. In a set-up mode, at least two different service methods are determined according to which the battery energy storage system is to be operated, and said at least two different service methods are prioritized with respect to each other based on at least one predefined criterion. In a working mode, the same battery energy storage system is operated according to the at least two different service methods in parallel. An energy content of the battery energy storage system is monitored, and a power demand to be provided to the electric grid according to each of the at least two different service methods is monitored. A total power demand is then calculated and compared with predefined power limits of the battery energy storage system. The battery energy storage system is operated according to at least one out of the at least two different service methods in an order of decreasing priority, in case that the calculated total power demand exceeds the predefined power limits and/or that the monitored energy content does not lie within the predefined energy limits.

According to an advantageous embodiment of the invention which can be used in addition or alternatively to the above, operation of the battery energy storage system according to at least one out of the at least two different service methods is controlled in the order of increasing priority such that the predefined power limits are met, preferably by first reducing the power provided by the battery energy storage system according to said at least one out of the at least two different service methods, and by then increasing the power provided according to said at least one out of the at least two different service methods.

According to an advantageous embodiment of the invention which can be used in addition or alternatively to the above, operation of the battery energy storage system according to at least one out of the at least two different service methods is interrupted in the order of increasing priority, in case that the calculated total power demand does not lie within the predefined power limits and/or that the monitored energy content does not lie within the predefined energy limits. The battery energy storage system is operated according to the remaining service methods out of the at least two different service methods, After the step of interrupting, operation of the battery energy storage system is resumed according to the interrupted at least one out of the at least two different service methods, in case that the calculated total power demand does not exceed the predefined power limits and that the monitored energy content lies within the predefined energy limits.

According to an advantageous embodiment of the invention which can be used in addition or alternatively to the above, in the set-up mode a plurality of different service methods is identified, and for each of the plurality of different service methods the at least one predefined criterion is calculated.

According to an advantageous embodiment of the invention which can be used in addition or alternatively to the above, for each of the identified plurality of different service methods, requirements of the service method are compared against parameters of the battery energy storage system to determine whether the battery energy storage system can be operated according to the service method or not. Further, said at least two different service methods according to which the battery energy storage system is operated are determined, based on a result of the comparison of requirements of the service method against parameters of the battery energy storage system.

According to an advantageous embodiment of the invention which can be used in addition or alternatively to the above, the predefined energy limits includes a minimum and maximum predefined energy content limit of the battery energy storage system. In the working-mode the monitored energy content of the battery energy storage system is compared with the minimum and maximum predefined energy content limit of the battery energy storage system.

According to an advantageous embodiment of the invention which can be used in addition or alternatively to the above, the predefined power limits is defined by a maximum discharge power and a maximum charge power the battery energy storage system is able to provide to the electric grid. The step of comparing the total power demand with the predefined power limits of the battery energy storage system includes comparing the calculated total power demand with the maximum discharge power and with the maximum charge power of the battery energy storage system.

According to an advantageous embodiment of the invention which can be used in addition or alternatively to the above, it is determined whether the operation of the battery energy storage system is blocked, preferably by determining whether the battery energy storage system can not be operated according to at least one service method. In case the battery energy storage system is blocked, at least one service method is determined according to which the battery energy storage system is operated to de-block the battery energy storage system.

According to an advantageous embodiment of the invention which can be used in addition or alternatively to the above, the total power demand is a sum of the power demands to be provided to the electric grid according to each of the at least two different service methods, wherein the power demand of a service method is either a discharge power demand or a charge power demand. Preferably, the discharge power demand is defined with a negative power value, and the charge power demand is defined with positive power value.

According to an advantageous embodiment of the invention which can be used in addition or alternatively to the above, the step of comparing the total power demand with the maximum power of the battery energy storage system is performed more frequently than a step of comparing the energy content with the predefined energy limits.

The present invention further provides a control unit for controlling a battery energy storage system to be connected to an electric grid. Said battery energy storage system is operated to supply and/or receive energy to/from the electric grid according to at least two different service methods. The control unit comprises a processing unit operable to perform in a set-up mode the following steps of determining at least two different service methods according to which the battery energy storage system is to be operated, and of prioritizing said at least two different service methods with respect to each other based on at least one predefined criterion. A first monitoring unit of the control unit monitors an energy content of the battery energy storage system. A second monitoring unit of the control unit monitors a power demand to be provided to the electric grid according to each of the at least two different service methods. The processing unit is further operable to perform in a working mode the following steps of: operating the same battery energy storage system according to the at least two different service methods in parallel; calculating a total power demand; comparing the total power demand with predefined power limits of the battery energy storage system; and operating the battery energy storage system according to at least one out of the at least two different service methods in an order of decreasing priority, in case that the calculated total power demand does not lie within the predefined power limits and/or that the monitored energy content does not lie within the predefined energy limits.

According to an advantageous embodiment of the invention which can be used in addition or alternatively to the above, in the working mode the processing unit controls operation of the battery energy storage system according to at least one out of the at least two different service methods in the order of increasing priority such that the predefined power limits are met. This is done preferably by first reducing the power provided by the battery energy storage system according to said at least one out of the at least two different service methods, and by then increasing the power provided according to said at least one out of the at least two different service methods.

According to an advantageous embodiment of the invention which can be used in addition or alternatively to the above, in the working mode the processing unit interrupts operation of the battery energy storage system according to at least one out of the at least two different service methods in the order of increasing priority. In case that the calculated total power demand exceeds the maximum power and/or that the monitored energy content does not lie within the predefined energy limits, the battery energy storage system is operated according to the remaining service methods out of the at least two different service methods. After the step of interrupting, operation of the battery energy storage system according to the interrupted at least one out of the at least two different service methods is resumed, in case that the calculated total power demand does not exceed the predefined power limits and that the monitored energy content lies within the predefined energy limits.

According to an advantageous embodiment of the invention which can be used in addition or alternatively to the above, in the set-up mode the processing unit identifies a plurality of different service methods, and calculates for each of the plurality of different service methods the at least one predefined criterion.

According to an advantageous embodiment of the invention which can be used in addition or alternatively to the above, in the set-up mode the processing unit is operable to: compare, for each of the identified plurality of different service methods, requirements of the service method against parameters of the battery energy storage system to determine whether the battery energy storage system can be operated according to the service method or not, and determine said at least two different service methods according to which the battery energy storage system is operated, based on a result of the comparison of requirements of the service method against parameters of the battery energy storage system.

According to an advantageous embodiment of the invention which can be used in addition or alternatively to the above, the predefined energy limits includes a minimum and maximum predefined energy content limit of the battery energy storage system, and the processing unit in the working mode compares the monitored energy content of the battery energy storage system with the minimum and maximum predefined energy content limit of the battery energy storage system.

According to an advantageous embodiment of the invention which can be used in addition or alternatively to the above, the processor in the working mode the method determines whether the operation of the battery energy storage system is blocked, preferably by determining whether the battery energy storage system can not be operated according to at least one service method. Then, in case the battery energy storage system is blocked, the processor of the control unit determines at least one service method according to which the battery energy storage system is operated to de-block the battery energy storage system.

According to an advantageous embodiment of the invention which can be used in addition or alternatively to the above, the predefined power limits is defined by a maximum discharge power and a maximum charge power the battery energy storage system is able to provide to the electric grid. The step of comparing the total power demand with the predefined power limits of the battery energy storage system includes comparing the calculated total power demand with the maximum discharge power and with the maximum charge power of the battery energy storage system.

The present invention provides a battery energy storage system comprising at least one storage battery and the control unit as explained above.

Furthermore, for example, a control apparatus (a controller or a control unit) for controlling an energy storage system to be connected to an electric grid comprises a processor and communications circuitry. The processor determines service methods. And the processor operates the energy storage system according to the service methods to provide, from the energy storage system to the electric grid, total power associated with the service methods.

Furthermore, the processor may prioritize the service methods. And in case that the total power does not lie within a predefined power limits of the energy storage system, the processor operates the energy storage system according to one out of the service methods in a descending order of priority. In this case, the processor may decrease provision of low-priority power associated with at least one out of the service methods in an ascending order of priority to adjust the total power to the predefined power limits.

Furthermore, in case that the total power is beyond an adjustable range, the processor may stop the provision of the low-priority power. The processor may prioritize the service methods using a descending order of Return on Investment (RoI) as a descending order of priority.

Before describing various embodiments of the invention in more detail, the following term will be defined.

The term "battery energy storage system" used in the claims and throughout the description, refers to an energy storage system based on a battery. Although the claims might be restricted to a battery energy storage system, the invention is also applicable to other energy storage systems as described in the background section, such as flywheel, CAES, SMES etc. Similarly, although the subsequent detailed description of the various embodiments are mostly described in connection with a battery energy storage system or "storage battery", other types of electric energy storage system are possible as well.

The term "service method" used in the claims and throughout the description, refers to a service to be provided to the electric grid, also known under the term ancillary service as explained in the Background Section.

The term "demand" used in the claims within the expression "power demand" refers to a charge power or discharge power that the battery energy storage system would be forced to provide to the electric grid according to the service at that particular point in time.

The term "stopping", "interrupting" used in the claims and throughout the description in connection with one or more particular services describes the process of no longer supplying to or receiving energy from the electric grid according to said particular service(s). The term shall not mean that the complete operation of the battery energy storage system is stopped, but that the battery energy storage system is only controlled according to the remaining services.

Two main characteristics of the energy storage system will be considered in the following, namely the power and energy of a storage system. As already explained in the Background Section, the parameter power relates to the rate at which the storage system is able to supply electric energy to or receive electric energy from (i.e. to provide to) an electric grid.

Figure 2:
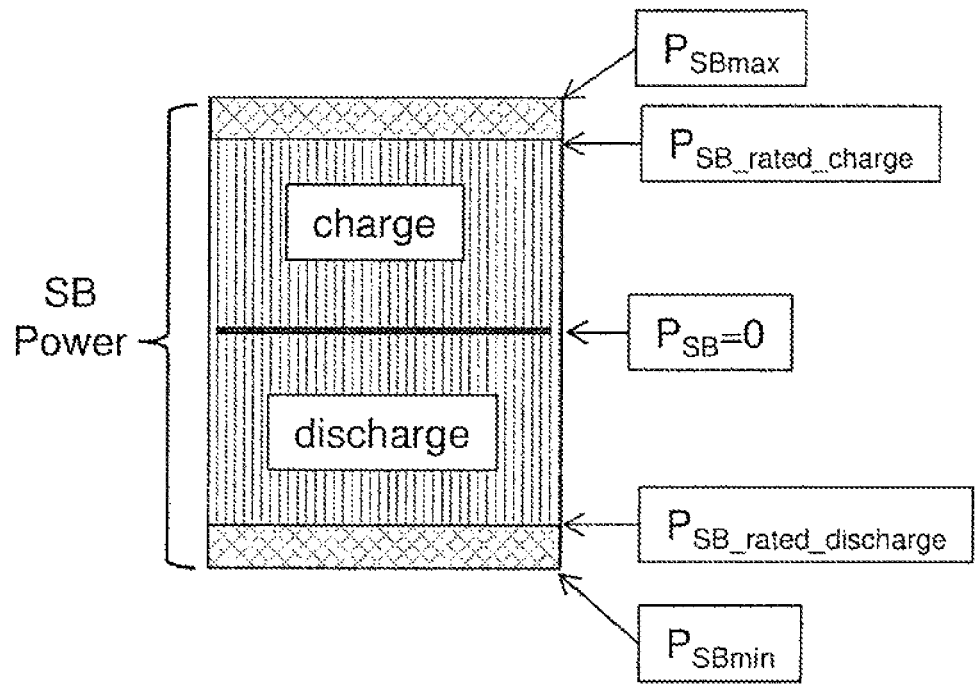
FIG. 2 shows schematically the power parameter of the energy storage system and power limits predefined for the energy storage system.

FIG. 2 illustrates schematically the power defined for a storage system. In general, the power may refer to a discharge power, referring to the rate at which electric energy is supplied from the storage system to the electric grid, or to a charge power, referring to the rate at which electric energy is received in the energy storage system from the electric grid. In the present example, the discharge power is given a negative sign, and the charge power is given a positive sign; of course, this may also be the other way round.

FIG. 2 also illustrates various power limits in connection with the storage battery (SB). $P_{SBmax}$ defines the physically-possible charge power maximum of the storage battery. $P_{SBmin}$ defines the physically-possible discharge power maximum of the storage battery; termed min for being mathematically the minimum value. $P_{SB\_rated\_charge}$ refers to the rated/design/nominal charge power of the storage battery. $P_{SB\_rated\_discharge}$ refers to the rated/design/nominal discharge power of the storage battery. The power limits $P_{SB\_rated\_discharge}$ and $P_{SB\_rated\_charge}$ are defined such that a charging/discharging process with a power between $P_{SB\_rated\_discharge}$ and $P_{SB\_rated\_charge}$ does not damage the storage battery. On the other hand, the power limits $P_{SBmax}$ and $P_{SBmin}$ are defined such that a charging process with a power between $P_{SBmax}$ and $P_{SB\_rated\_charge}$ and a discharging process with a power between $P_{SBmin}$ and $P_{SB\_rated\_discharge}$ might damage the storage battery system.

Figure 3:
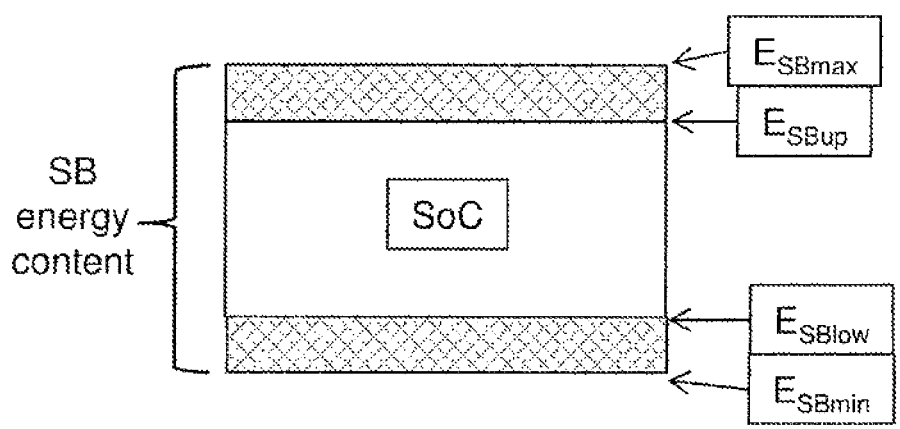
FIG. 3 shows schematically the energy parameter of the energy storage system and energy limits predefined for the energy storage system.

FIG. 3 illustrates schematically the electric energy content (SoC, State of Charge) of the storage battery and corresponding energy content limits. In analogy to the power limits explained in connection with FIG. 2, also four energy limits may be defined for a storage battery. The energy contents $E_{SBmax}$ and $E_{SBmin}$ define the maximum respectively minimum physically-possible state of charge of the storage battery. The energy contents limits $E_{SBup}$ and $E_{SBlow}$ define state of charges in the storage battery, such that the storage battery having an electric energy amount between $E_{SBup}$ and $E_{SBlow}$ stored therein is not damaged. On the other hand, $E_{SBmax}$ and $E_{SBmin}$ are predefined such that a state of charge between $E_{SBmax}$ and $E_{SBup}$ and between $E_{SBmin}$ and $E_{SBlow}$ might damage the storage battery.

The above-explained parameters power and energy will be used throughout the various embodiments to be explained in the following.

Figure 4:
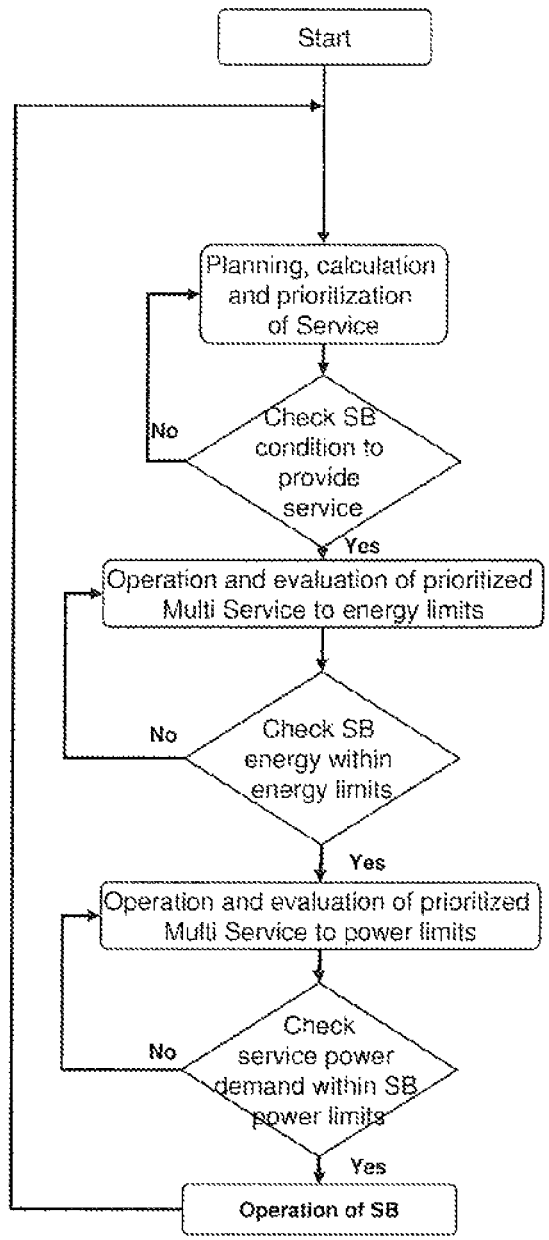
FIG. 4 is a state diagram illustrating the control method of the energy storage system according to one embodiment of the invention.

FIG. 4 refers to an exemplary embodiment of the invention and gives an overview of the operation of the storage battery according to this embodiment. It should be noted that before actually operating the storage system, services are to be identified and determined according to which the storage battery is then to be operated. Put differently, the storage battery shall supply energy to and/or receive energy from the electric grid according to multiple services. For the present invention, it is assumed that at least two services are identified and agreed upon according to which the same energy storage system is operated in parallel, in contrast to operating separate storage systems respectively according to one service. In the background section of this application various different services are discussed.

Correspondingly, in a first step (may be termed SB set-up) these services have to be identified and established before starting to operate the battery storage system accordingly. In some embodiments of the invention, this may involve the planning, calculation and prioritization of the services as well as a countercheck as to whether these services can actually be provided by the battery storage system or not, as depicted in FIG. 4.

Subsequently, the operation of the storage battery according to the various planned services can be initiated. Accordingly, the energy storage system is thus controlled to supply energy to the grid and/or receive energy from the grid according to the multiple services in parallel. During the operation of the storage battery, an algorithm periodically checks whether the parameters power and energy of the storage battery are within predefined limits, so as to ensure a proper and safe operation of the storage battery. This is depicted in FIG. 4 with the boxes named "Check SB energy within energy limits" and "Check service power demand within SB power limits". The power and energy provided by the storage system varies with time depending on the particular services and the power and energy that is to be provided according to each service.

In case that the energy limits and/or the power limits are not met during operation of the storage battery, the storage battery cannot support all the services agreed upon during set-up, and only the most prioritized services are further provided; in other words, in the case where power and/or energy of the storage battery are not within the predefined boundaries, provision of one or more of the services is stopped (i.e. interrupted) such that the battery storage again may be operated within the power and energy limits defined before. The interruption of the lower priority services is maintained of course as long as strictly necessary, i.e. provision of these one or more stopped services is resumed as soon as the power and energy of the storage battery again allow doing so. The corresponding algorithm is repetitively and cyclically performed. In the above exemplary embodiment of the invention as depicted in FIG. 4, it is assumed that the algorithm first checks the energy constraints of the storage battery followed by the power constraints. However, this is merely an example, and according to further embodiments of the invention, it is also possible to first determine whether the power conforms to the power limits followed by determining whether the energy complies with the energy limits. Alternatively, the two checks may be performed in parallel.

(Set-Up of Services for Use with Storage Battery)

The following provides exemplary information on how to implement the step of planning, calculation and prioritization of services, mentioned above.

Figure 5:
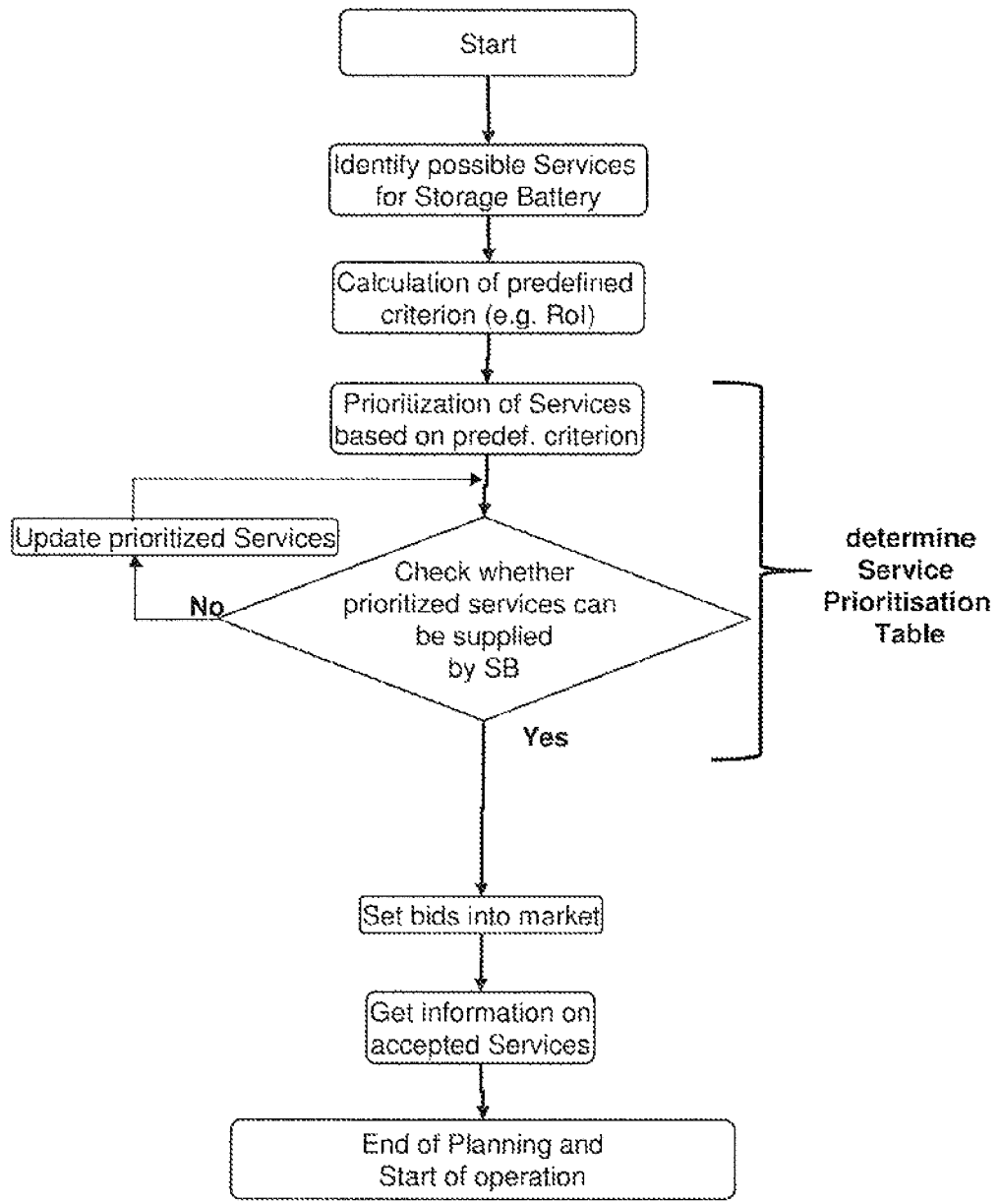
FIG. 5 is a state diagram illustrating the set-up (preparation) phase for setting up the later operation of the energy storage system, according to one embodiment of the invention.

FIG. 5 is a state diagram in which the various steps are illustrated that may be performed for setting up the operation of the storage battery. As explained above, the following is an example on how to determine and prioritize the particular at least two services according to which the storage battery is to be operated in parallel.

In the beginning, possible services are to be identified, such as Frequency Response, Forecast Deviation, Arbitration or Peak Shift. Identifying the possible services can be done in several ways. For example, the electricity market may be analyzed in order to determine services that are needed. Or, an energy storage system might be able to provide services to improve security and stability of the electric grid, which are not necessarily offered through a market; correspondingly, some services are directly offered to grid operators. Another example would be to analyze existing business models which match to energy storage systems. For the following discussion, as an example it is assumed that the services of Frequency Response, Forecast Deviation and Arbitrage are identified.

Once all "possible" services are identified, these services may be prioritized. In general, a predefined criterion of each service may be compared. One option on how to do that is using the Return on Investment (RoI) these services are offering. To said end, for each service the corresponding RoI is calculated.

An exemplary way of calculating the RoI is given below, although it should only be understood as an example for an RoI. There are other ways of calculating an RoI which are also possible and not explained, but still applicable to the various embodiments of the present invention.

Calculation for RoI can be performed in a very simple model up to sophisticated models. Simple RoI calculation may take into account estimated annual revenue streams during the lifetime of the asset divided by the investment of asset itself. A more sophisticated model of RoI can be modeled based on a more detailed calculation of the revenue stream of the market by assuming total number of operation hours per day, performed cycles and annual interest rate etc. For the energy storage system, parameters like system efficiency, number of charge/discharge cycles per day and number of charge/discharge cycles in life of the system can be assumed for more detailed calculation.

In general, any other suitable predefined criterion can be used to evaluate the different services and to prioritize the services among each other. Advantageously, the predefined criterion (or criteria) allows representing a monetary value that the company may gain from providing the service to the electric grid. Other examples for the predefined criterion are Cost per service utilization, Cost per performance or Cost per battery life cycle.

According to FIG. 5, the next step would be to actually prioritize the identified services according to this predefined criterion, in this particular example of FIG. 5 the RoI.

The result of the prioritization can be seen in the following Service Prioritization Table, where as a way of example the services Frequency Response, Forecast Deviation and Arbitrage that have been identified previously are prioritized as listed below.

TABLE 1

| Priority | Service | RoI | Characteristic |
| --- | --- | --- | --- |
| 1 | Frequency Response | 0.15 | 1 MW, weekly tender |
| 2 | Forecast Deviation | 0.10 | 0.5 MW |
| 3 | Arbitrage | 0.05 | 1 MW, hourly tender |

Subsequently, or alternatively before the prioritization step, the identified services (FR, FD and Arbitration) are checked against the capabilities of the storage battery. In more detail, already at this point of time during the set-up of the storage battery, it is advantageous to check the services for the likelihood that the particular service(s) can indeed be provided during operation. It should be noted that after the set-up phase the agreed upon services are to be provided to the electric grid, otherwise the company may be penalized. Therefore, the requirements that each of the identified service will impose on the storage battery during the actual operation will be compared against the capabilities of the storage battery; in this connection, not only the requirement(s) of each service will be considered separately, but also the combination of requirements of all the identified services imposed on the storage battery maybe considered.

Each service imposes particular requirement(s) on the energy storage battery that the storage battery has to fulfill to be able to provide said service. In one example, the requirements of each service may reflect the average requirements of the service imposed on the system during operation, and not peak requirements that may be substantially higher. The "characteristics" listed above in the table for each service however are the peak values of the services.

For example, if a particular service requires a relative discharge power higher than $P_{SBmax}$, the battery storage cannot provide such a service. Or if a particular service (such as the Arbitrage service) requires a large amount of energy, and if it is already foreseeable that the SoC of the battery storage is too low, such a particular service cannot be supported. If the rate of power change is faster than the power conditioning unit can follow, such a service cannot be supported. Also, from market point of view it is much more favorable to commit services with short delivery time and gate closure; then, a decision can be changed more frequently, and different services can be committed.

Further, when summing the requirements imposed by all identified services and comparing same against the capabilities of the storage system, it may be already apparent that not all services can be provided to the electric grid at the same time (i.e. parallel) by this one battery energy storage system. In this case, it is again advantageous to eliminate at least one of the services, such that the requirements of the remaining services and the capabilities of the storage system are matching each other. Prioritizing the services before performing the comparison against the capabilities of the storage system allows eliminating the least prioritized service(s) first, and thus eliminating those services that would achieve the lowest benefit (in terms of RoI) for the company.

For example, the result of checking the three services, Frequency Response, Forecast Deviation, Arbitrage (see table above) against the capabilities of the storage battery could be that the storage battery will not be capable of supporting the three services at the same time (result of check in FIG. 5 is "No"). Consequently, the algorithm decides to eliminate the least-prioritized service, which in this exemplary case is the Arbitrage.

FIG. 5 illustrates this step with the box: "Update prioritized Services".

The correspondingly updated prioritized Service Prioritization Table thus would be like this.

TABLE 2

| Priority | Service | RoI | Characteristic |
|---|---|---|---|
| 1 | Frequency Response | 0.15 | 1 MW, weekly tender |
| 2 | Forecast Deviation | 0.10 | 0.5 MW |
| ~~3~~ | ~~Arbitrage~~ | ~~0.05~~ | ~~1 MW, hourly tender~~ |

The now resulting requirements imposed by the remaining services, Frequency Response and Forecast Deviation, are then again checked against the capabilities of the storage battery system to make sure that the storage system will be able to provide energy according to these two services (at least as far as can be expected). For the following, it is assumed that the check is positive ("Yes" in FIG. 5), i.e. both remaining services can be supplied by the storage battery in parallel.

As explained above, after identifying (and possibly prioritizing) the possible services, it is advantageous to at least check the services for conformance with the capabilities of the storage battery, and if necessary to eliminate services.

Consequently, based on the thus determined services, corresponding bids may be made to the market and are assumed to be accepted by the market.

This concludes the preparation phase, and based on the thus determined services, the actual operation of the battery energy storage system can be started.

(Operation Phase)

In the operation phase the battery storage system is controlled in such a way to supply electric energy to and/or receive electric energy from the electric grid according to each of the agreed services. The control of the same energy storage system according to each service is performed in parallel.

Operation of the energy storage system is explained in the following exemplary based on the services Frequency Response and Forecast Deviation.

Grid Frequency is measured and should stay within a band of 50 Hz+/−20 mHz. Within this operation band the energy storage system has not to operate and provides no frequency response. If the grid frequency drops below 49.98 Hz the energy storage system has to provide power (discharge of SB) to the grid according to a predefined pattern. The requirement to provide power to the grid maintains as long as grid frequency is outside the above-mentioned frequency band.

At the same time forecast deviation service is provided by the energy storage system. Assuming an over-production of wind energy compared to settled bit into market, the energy storage system is requested to charge wind energy into the battery.

As both services take place during the same time, the energy storage system has to discharge, by providing power to grid, and charge by taking surplus wind energy. Depending on the value/amount of power of each service the sum of both service can result in operation of the energy storage system by providing no power (when power request for frequency response equals power request of forecast deviation), by providing charge power (when forecast deviation is greater than frequency response), or by providing discharge power (when forecast deviation is smaller than frequency response).

(Energy Monitoring)

Figure 6:
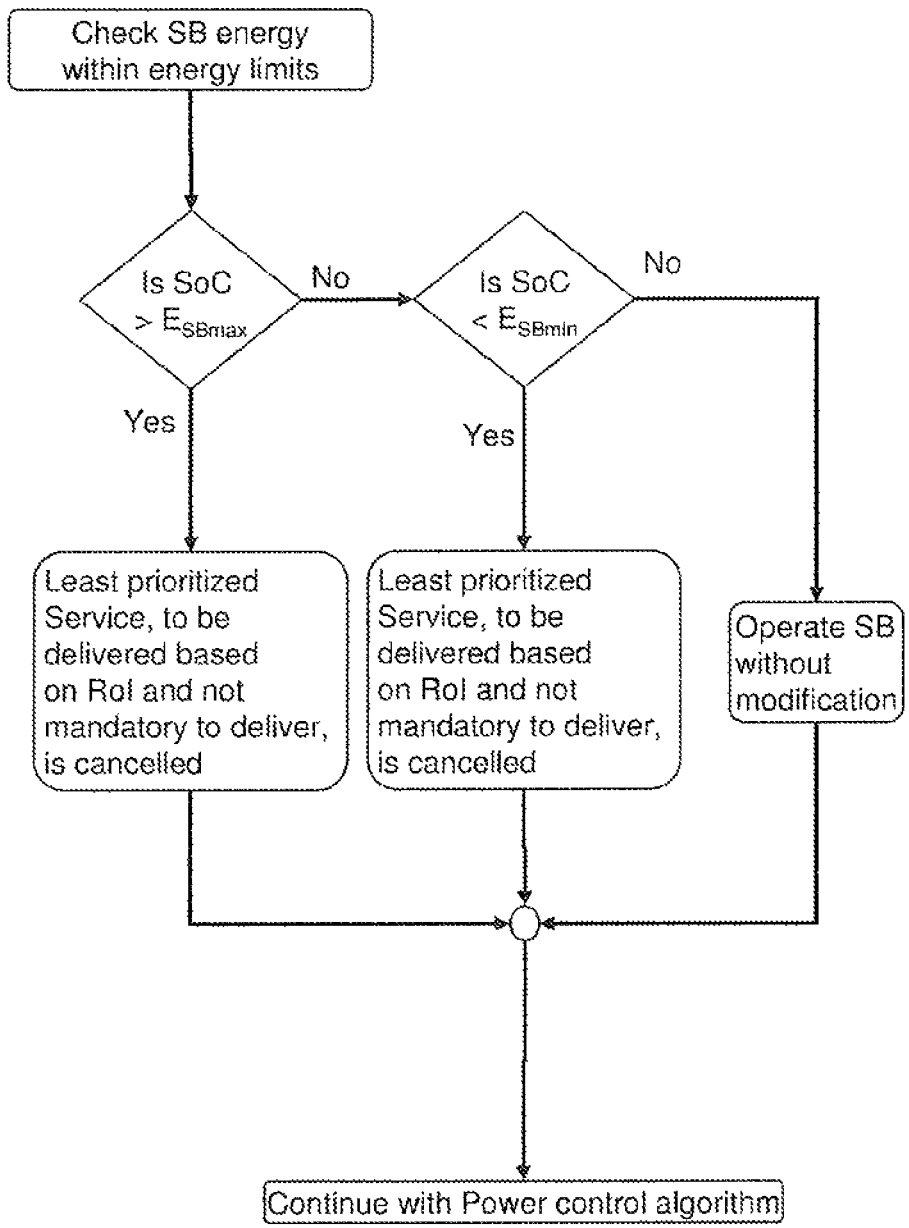
FIG. 6 is a state diagram illustrating the energy monitoring according to one embodiment of the invention.

FIG. 6 illustrates the energy monitoring according to an embodiment of the invention. As apparent, the state of charge, i.e. the energy content, of the energy storage system is compared against energy limits defined for the energy storage system. In this particular example of the energy monitoring the energy limits $E_{SBmin}$ and $E_{SBmax}$ are used, i.e. even accepting a damage of the storage battery. Alternatively, the energy limits $E_{SBlow}$ and $E_{SBup}$ can be used as limits for comparing the SoC of the battery energy storage system, thus making sure that the battery energy storage system will not suffer damage during operation. As a further alternative, $E_{SBmin}$ and $E_{SBup}$ or $E_{SBlow}$ and $E_{SBmax}$ may be used in combination as energy limits.

In any case, the energy content of the storage battery is monitored as to whether it remains within the energy constraints predefined for the storage battery.

If in both cases it is determined that the energy content is within the energy limits ("No" in FIG. 6), then with regard to the state of charge (energy) of the storage battery, all services can be continued to be provided.

On the other hand, if it is determined that the energy content is not within the energy limits (i.e. either one of the limits is not fulfilled, "Yes" in FIG. 6), then not all services can be continued to be provided. In such a case, the service(s) having lower priority can no longer be supported, such that the battery energy storage system only continues to be operated according to the high priority service(s).

In particular, it may be assumed for illustration purposes only that only two services, Frequency Response and Forecast Deviation, are supplied by the battery energy storage system. Assuming this, when the energy constraints of the SB are not fulfilled (i.e. "Yes" in FIG. 6), the less prioritized service operation (i.e. for the Forecast Deviation) is interrupted, such that the operation of the battery energy storage system is continued based solely on the Frequency Response service.

Figure 7:
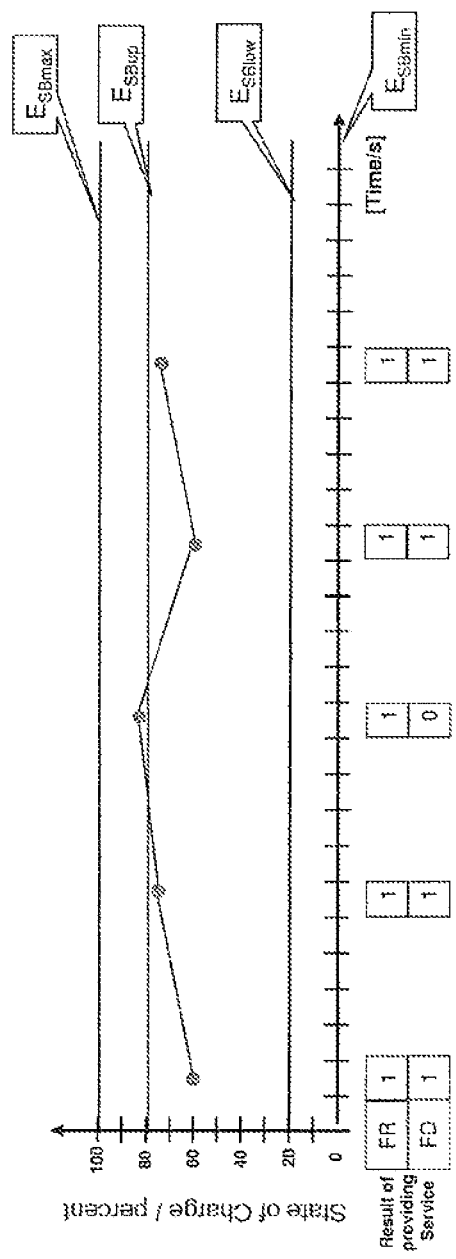
FIG. 7 shows the change of the energy content of the storage battery over time, and further illustrates the disablement of the lower priority service in case the energy content exceeds an energy limit.

This operation is exemplary depicted in FIG. 7, being a diagram illustrating the change of the energy content of the energy storage system over time. As apparent therefrom, the energy limits are drawn in, and it is assumed that the $E_{SBup}$ limit is the relevant limit for the energy monitoring. For this particular embodiment of the invention, it is also assumed that the energy comparing is not performed at every time instance, but only at every fifth time instance; this may be advantageous since the SoC usually does not change very fast such that performing the check every x time instances, instead of every time instance, suffices and allows to save processing power. However, this is but a mere advantageous embodiment; also the energy monitoring can be performed at every time instance.

As can be see from FIG. 7, the energy content of the storage battery system is increasing (battery system is being charged, e.g. due to compensate a positive forecasting error) until it exceeds the predefined upper limit $E_{SBup}$. Correspondingly, the Forecasting Deviation service having the lower priority is halted (i.e. interrupted/stopped), whereas the Frequency Response service with the higher priority is not halted.

As can be also appreciated from FIG. 7, the previously-halted Forecasting Service can again be resumed once it is determined that the energy content is again below the limit (or more generally within the predefined limits). Correspondingly, the battery storage system can be again operated according to both services.

(Power Monitoring)

Figure 9:
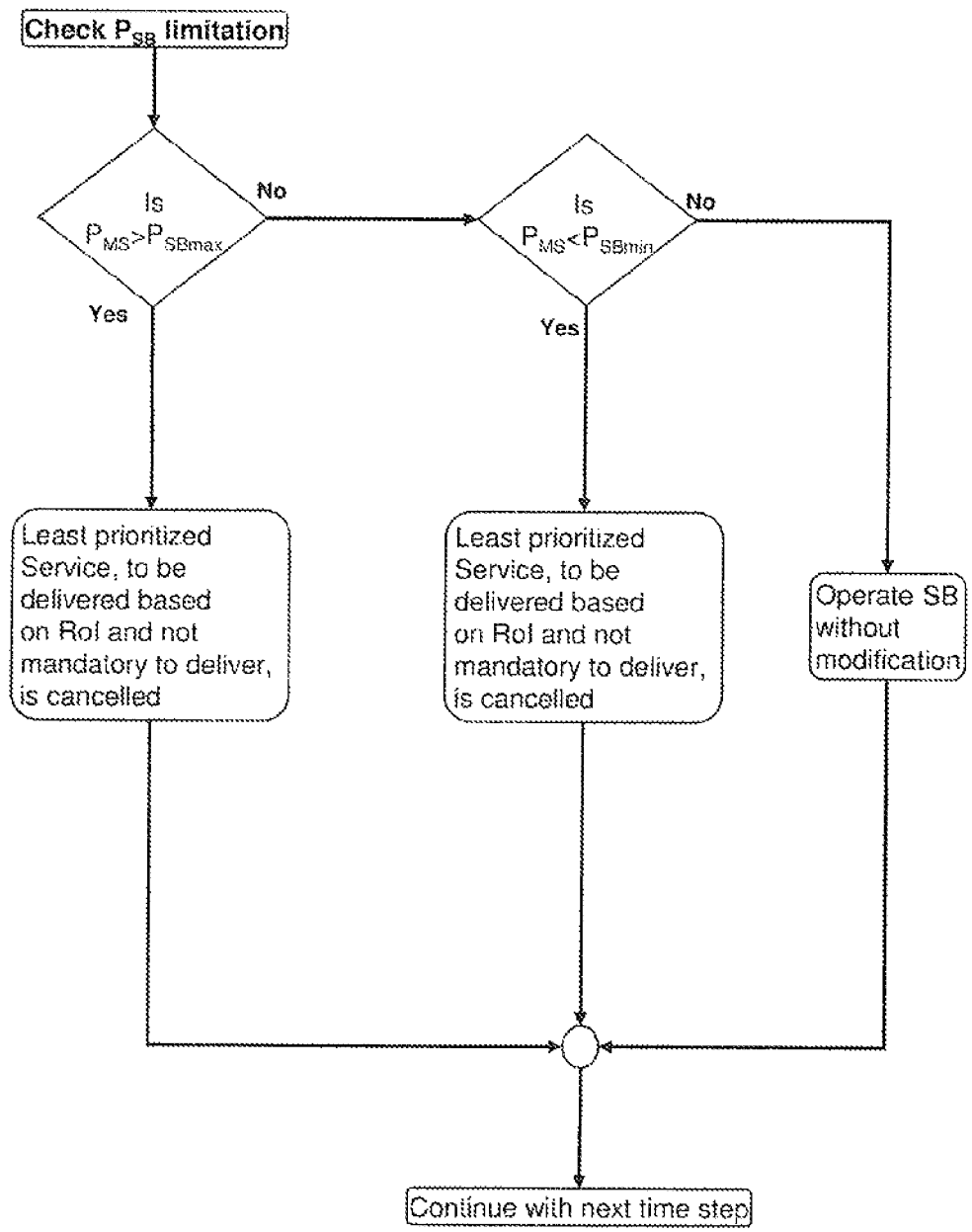
FIG. 9 is a state diagram illustrating the power monitoring according to one embodiment of the invention.

FIG. 9 illustrates the power monitoring of the storage battery according to one embodiment of the invention. It is assumed that each service that is to be provided by the storage battery has a particular power demand (be it discharge or charge).

Figure 8:
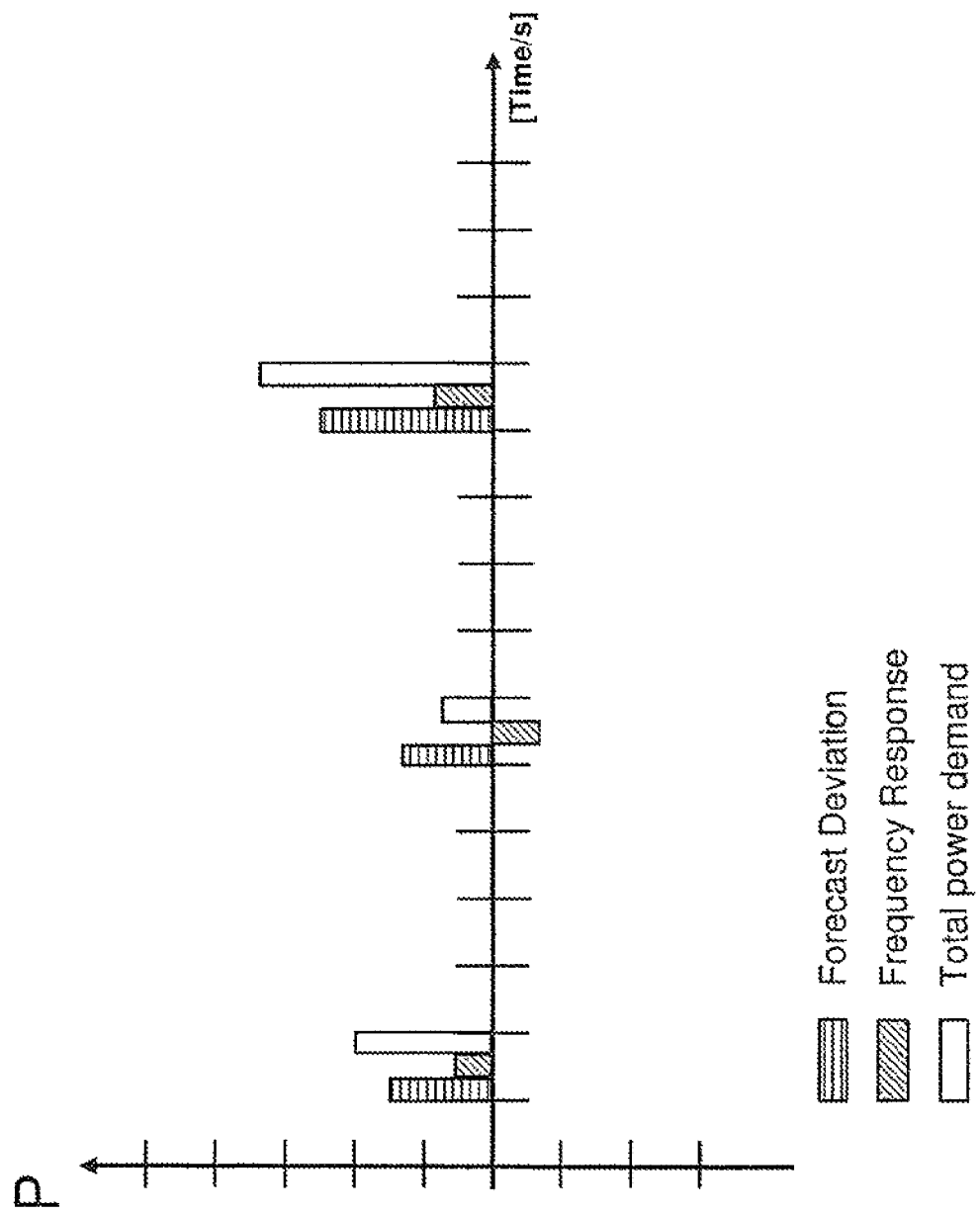
FIG. 8 illustrates the power demand of two services, as well as the resulting total power demand.

A total power demand of all services is correspondingly the sum of the power demands of all services that the storage battery shall provide; in this particular example, the sum of power demands of Forecast Deviation and Frequency Response. FIG. 8 illustrates the combination of two power demands.

As depicted in FIG. 9, the total power demand ($P_{MS}$, Power of Multi-Service) is compared against the two power limits predefined for the storage battery, in this case $P_{SBmax}$ and $P_{SBmin}$. The power limits could be alternatively $P_{SB\_rated\_charge}$ and $P_{SB\_rated\_discharge}$, or any combination of the four power limits defined in FIG. 2.

In case the total power demand is within the power limits ("No" in FIG. 9), it is assumed that the total power demand can be provided by the storage battery for all services, and thus with regard to power, the storage battery can be operated according to all services at the same time.

On the other hand, in case the total power demand exceeds any of the two power limits, the storage battery cannot support all services at the same time, and at least one service needs to be interrupted in order to be within the power limits again. In an advantageous embodiment, it is determined that the least prioritized service is halted as long as the power limits are exceeded, and resumed later once the total power demand would again be within the power limits.

Figure 10:
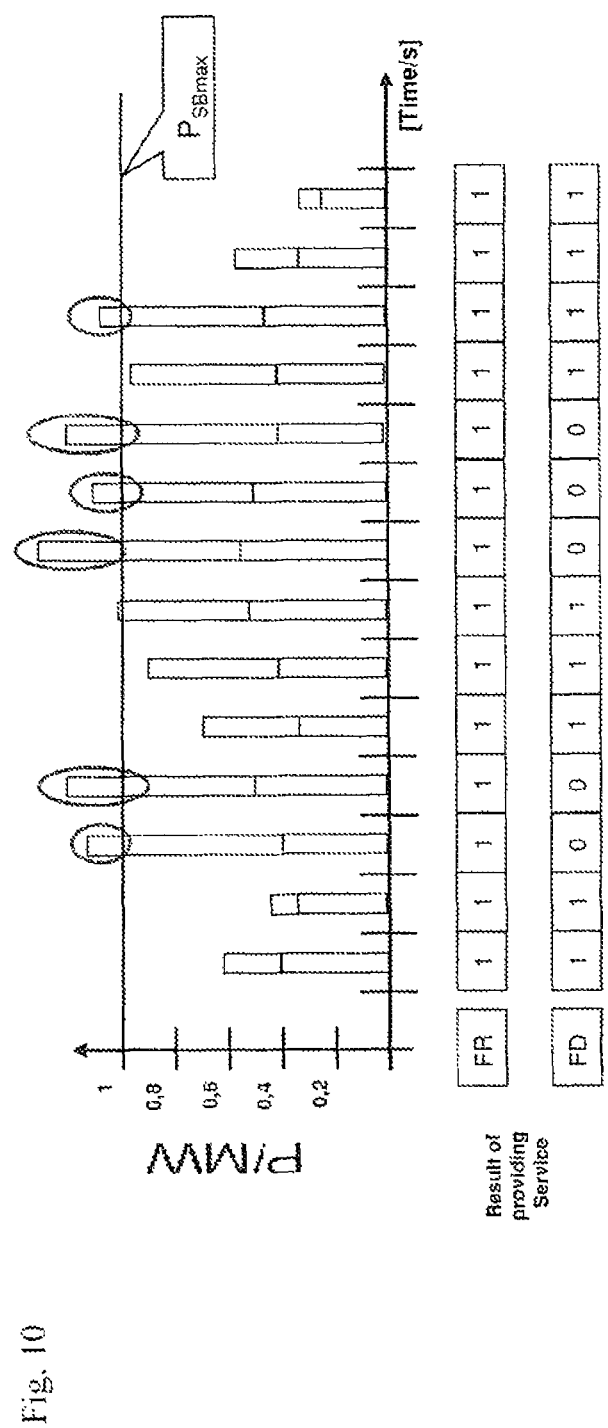
FIG. 10 schematically exemplifies the power monitoring.

FIG. 10 schematically illustrates the power monitoring. For illustration purposes only, it is assumed that both services Frequency Response (FR) and Forecast Deviation (FD) have a positive power demand, adding up instead of compensating each other. As can be seen, when it is determined that the total power demand exceeds the power limit $P_{SBmax}$, the service Forecast Deviation (FD) is stopped (see "0" in FIG. 10) and resumed when the power limit is no longer exceeded.

It should be noted that a service may be mandatory, meaning that this service must be provided by the system. Either the priority given to that service reflects this by being the highest possible priority (independent from RoI), or even if priority according to RoI is low, the mandatory service cannot be stopped. Instead, another perhaps higher priority service must be stopped when necessary.

(Storage System)

Figure 11:
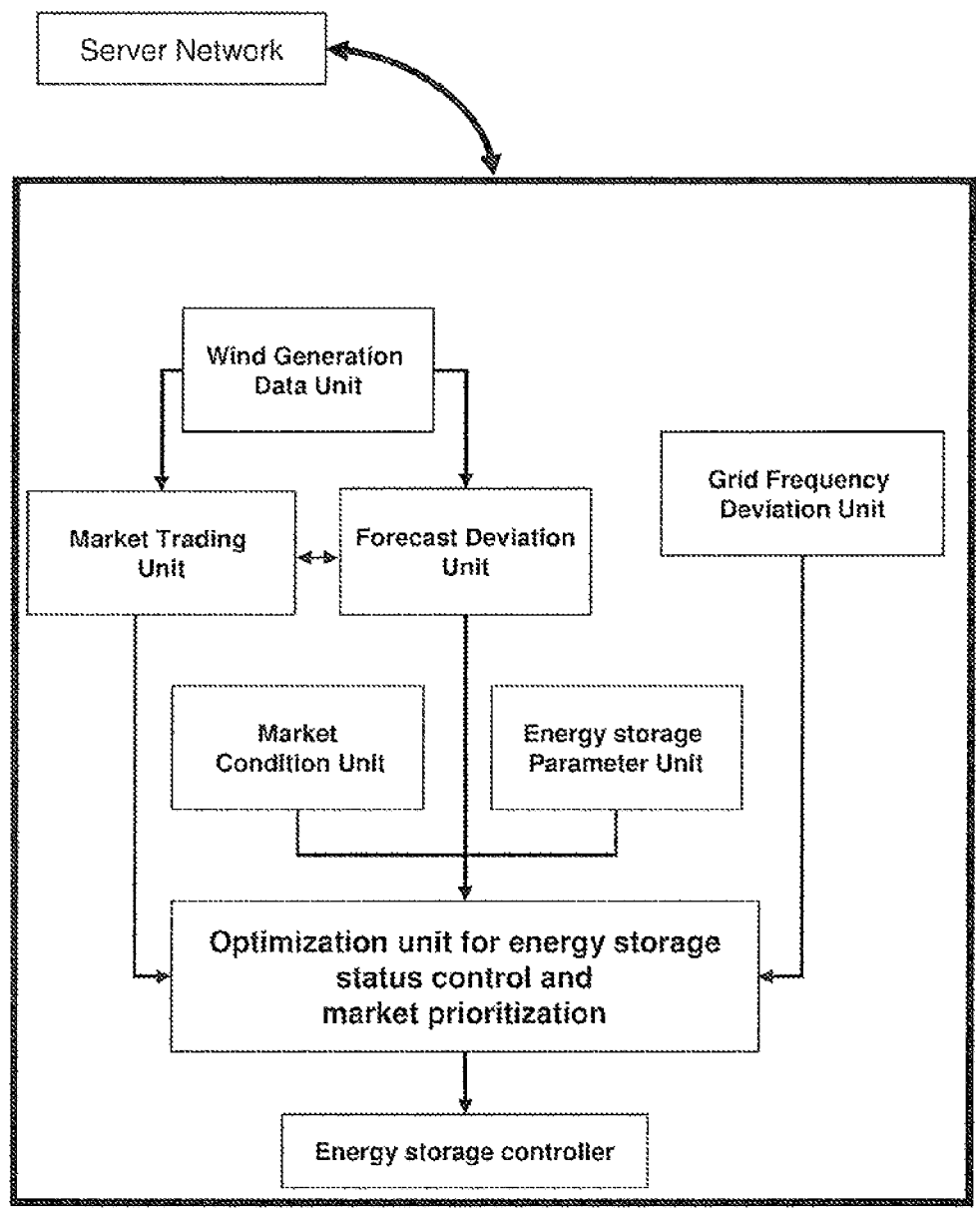
FIG. 11 shows an exemplary control unit for controlling an energy storage system according to one embodiment of the invention.

FIG. 11 depicts an exemplary control unit for controlling a battery storage system, being in communication with a server network. As can be seen, it is assumed that the power generation is based on wind, and that basically only the services Forecast Deviation and Frequency Response are provided. Correspondingly, a Wind Generation Data Unit provides long and short term forecast data to the Market Trading Unit and real-time data to the Forecast Deviation Unit. The Market Trading Unit and Forecast Deviation Unit exchange data on the error and amount of power which can be traded additionally. The Forecast Deviation Unit compensates excess and insufficient generation by comparing real time generation with scheduled operation. Grid Frequency Deviation Unit estimates the power requested from the Storage Battery.

Market Conditioning Unit provides information on regulations, technical requirements and prices. Energy Storage Parameter Unit includes data on power, capacity, SoC and response time. Optimization Unit decides the best operation of the Storage Battery taking into account energy markets and limitations of the storage battery (e.g. power and energy).

The Energy Storage Controller manages the operation of the storage battery. The Server Network allows exchange of data on weather, grid and market with the controller unit.

Further Embodiments

In the above-described embodiments of the invention, the least prioritized services are interrupted in case the energy or power limits are not met during operation. According to another more advantageous embodiment of the invention, instead of interrupting the service provision, the service provision may be merely reduced to the extent that the energy/power limits are met, as will be explained in more detail below.

For example, when assuming that the power monitoring determines that the maximum power limit is exceeded by the total power demand of all services, all services can no longer be provided by the energy storage system at the same time. In that case, the power to be provided to at least one of the services is reduced such that the power limit is met again. In certain cases of course, if the power provided to the service must be reduced to 0 (i.e. reduced to a minimum), the service provision is basically interrupted, thus being similar to the functioning of the previous embodiments.

Also, depending on the total power demand, one service may have to be interrupted, while the power provision according to another service is merely reduced so as to fulfill the power requirements given by the energy storage system. Thus, the previous embodiments related to the interruption of the service provision may be combined with the present embodiment of reducing the service provision.

The power provision for the "reduced-power" service may be increased later as far as the power limit of the battery storage system allows. Advantageously, the energy storage system is thus operated always at its power limit, which increases efficiency of the energy storage system.

This may be performed at every time instance.

As soon as the total power demand is within the power limits, then all services can be fully provided by the energy storage system; similarly to resuming the operation of an interrupted service in the previous embodiments.

In further embodiments of the invention, the energy monitoring during operation of the energy storage system is changed. In particular, the further embodiments deal with situations where the operation of the energy storage system gets blocked when being operated according to the algorithm of FIG. 6.

For example, in case the energy content of the energy storage system is at the upper energy limit, no further energy can be basically received in the energy storage system without (severely) damaging the energy storage system. Furthermore, in case all the services according to which the energy storage system is operated are such that the energy storage system is to receive energy, no service can be provided at all, since the SoC is already at its limit. The operation of the energy storage system is thus blocked.

In the converse example, where the energy content of the energy storage system is at the lower energy limit, no further energy can be supplied to the electric grid. If furthermore all the services according to which the energy storage system is operated are such that the energy storage shall supply energy, operation is no longer possible at all.

As can be appreciated, depending on the circumstances and on the particular services that shall be provided, there may be situations where the operation of the energy storage system gets blocked. In those cases, it may be advantageous to either charge or discharge the energy storage system as needed.

The following embodiment allows reconfiguring the operation of the energy storage system by determining a further service that allows charging or discharging the battery as needed.

Figure 12:
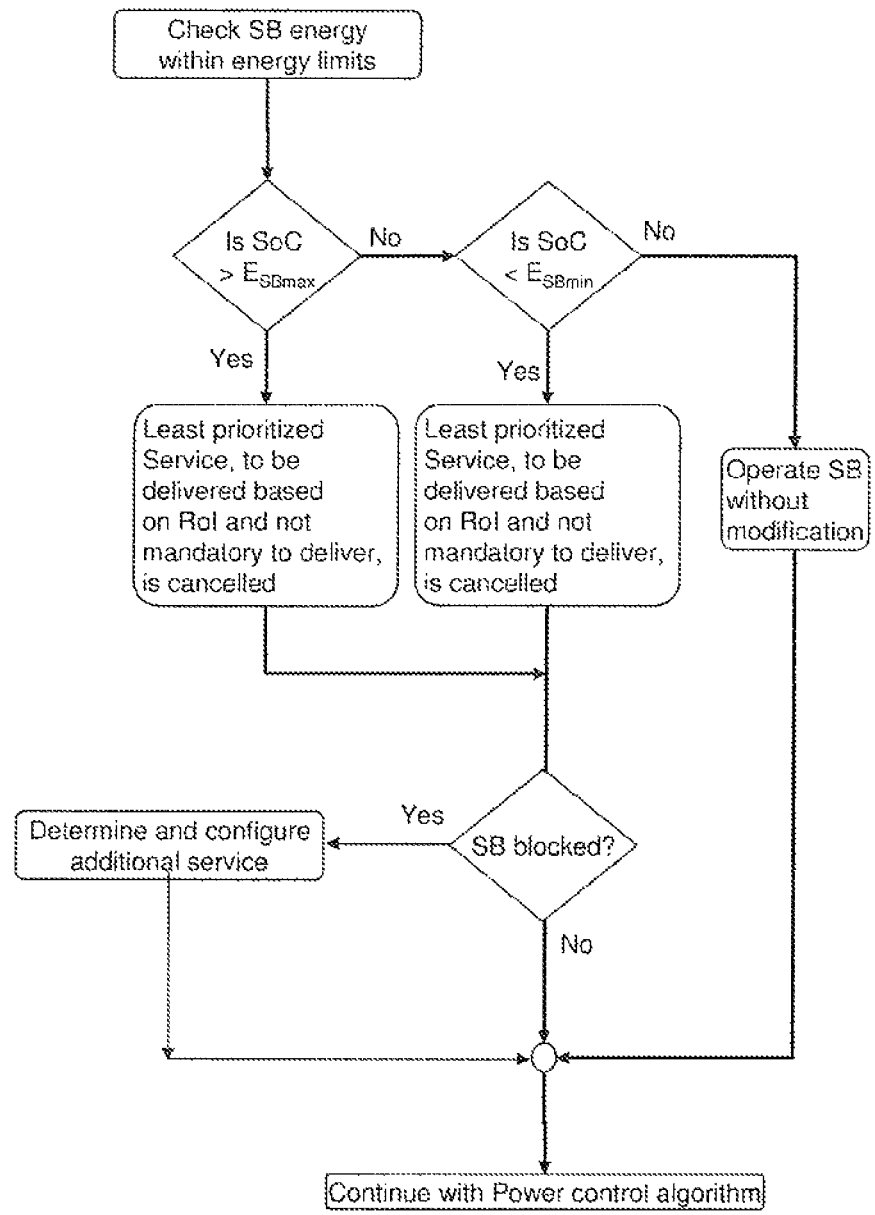
FIG. 12 is a state diagram illustrating the energy monitoring according to another embodiment of the invention, where additional services are determined to allow further operation of the energy storage system.

FIG. 12 illustrates an exemplary embodiment of this invention. In this example, the check as to whether the energy storage system is blocked, is performed within the energy monitoring, and in particular in case a service is interrupted. Alternatively, the check may be performed in parallel to the energy monitoring.

In any case, the check "SB blocked?" determines whether the energy storage system is still operating according to at least one service. If it is determined that all services have been successively interrupted due to exceeding the energy limits, at least one additional service is to be determined. The additional service shall be determined such that it allows to de-block the energy storage system, to remove the reason for the blocking. For example, the Energy Market service allows to sell or buy electric energy at the market (see Background Section), and thus to charge or discharge the energy storage system.

Consequently, if the energy storage system is blocked due to being at the upper energy limit (and all services demanding to receive energy from the grid), the Energy Market service is configured such that energy is sold to the market, thus discharging the energy storage system; since the energy storage system is no longer at the energy limit, the operation of the energy storage system according to the other services (or at least part thereof) can be resumed.

Similarly, if the energy storage system is blocked due to being at the lower energy limit (and all services demanding to supply energy to the grid), the Energy Market service is configured such that energy is bought from the market, thus charging the energy storage system.

As exemplary illustrated in FIG. 11, a control unit for the energy storage system may include hardware units performing the various steps necessary to implement the embodiments of the invention.

The control method explained above in connection with FIGS. 4-10 and 12 may be alternatively implemented by means of software modules or computer-readable instructions stored on one or more computer-readable media, which when executed by a processor or device component, perform the described various embodiments of the invention. Likewise, any combination of software modules, computer-readable media and hardware components is anticipated by the invention. The software modules may be stored on any kind of computer readable storage media, for example RAM, EPROM, EEPROM, flash memory, registers, hard disks, CD-ROM, DVD, etc.

The invention claimed is:

1. A method for controlling an energy storage system connected to an electric grid, the method comprising:
   determining at least two different energy services according to which the energy storage system is to be operated;
   operating the same energy storage system in parallel according to the two different energy services to provide, from the energy storage system to the electric grid, total power associated with the two different energy services; and
   decreasing provision of low-priority power associated with at least one out of the two different energy services in an ascending order of priority to adjust the total power to predefined power limits of the energy storage system, in case that the total power does not lie within the predefined power limits,
   wherein the two different energy services are prioritized using a descending order of Return on Investment (RoI) as a descending order of priority.

2. The method according to claim 1,
   wherein the energy storage system is operated according to at least one out of the two different energy services in a descending order of priority, in case that the total power does not lie within the predefined power limits.

3. The method according to claim 1,
   wherein the provision of the low-priority power is stopped, in case that the total power is beyond an adjustable range in which the total power is adjusted to the predefined power limits.

4. A method for controlling an energy storage system connected to an electric grid, the method comprising:
   determining at least two different energy services according to which the energy storage system is to be operated;
   operating the same energy storage system in parallel according to the two different energy services to provide, from the energy storage system to the electric grid, total power associated with the two different energy services;
   decreasing provision of low-priority power associated with at least one out of the two different energy services in an ascending order of priority to adjust the total power to predefined power limits of the energy storage system, in case that the total power does not lie within the predefined power limits;
   monitoring an energy content of the energy storage system;
   monitoring a power demand corresponding to power to be provided to the electric grid according to each of the two different energy services;
   calculating a total power demand; and
   comparing the total power demand with the predefined power limits,
   wherein in a set-up mode, the method comprises the determining,
   in a working mode, the method comprises the operating, the monitoring of the energy content, the monitoring of the power demand, the calculating, the comparing, and the operating includes:
   operating the energy storage system according to, in parallel, the two different energy services, in case that the calculated total power demand lies within the predefined power limits and that the monitored energy content lies within predefined energy limits; and
   operating the energy storage system according to at least one of the two different energy services in a descending order of priority, in case that the calculated total power demand does not lie within the predefined power limits or that the monitored energy content does not lie within the predefined energy limits.

5. The method according to claim 4, further comprising in the working mode,
controlling operation of the energy storage system according to at least one of the two different energy services in the ascending order of priority such that the predefined power limits are met by first reducing the power provided by the energy storage system according to the at least one of the two different energy services, and by then increasing the power provided according to the at least one of the two different energy services.

6. The method according to claim 4, further comprising in the working mode:
interrupting operation of the energy storage system according to at least one of the two different energy services in the ascending order of priority, in case that the calculated total power demand does not lie within the predefined power limits or that the monitored energy content does not lie within the predefined energy limits;
operating the energy storage system according to the remaining energy service of the two different energy services; and
resuming, after the interrupting operation of the energy storage system, operation of the energy storage system according to the interrupted one of the two different energy services, in case that the calculated total power demand lies within the predefined power limits and that the monitored energy content lies within the predefined energy limits.

7. The method according to claim 4, further comprising in the set-up mode:
identifying a plurality of different energy services; and
calculating for each of the plurality of different energy services the at least one predefined criterion.

8. The method according to claim 7, further comprising in the set-up mode:
comparing, for each of the identified plurality of different energy services, requirements of the energy service against parameters of the energy storage system to determine whether the energy storage system is able to be operated according to the energy service or not; and
determining the two different energy services according to which the energy storage system is operated, based on a result of the comparison of requirements of the energy services against parameters of the energy storage system.

9. The method according to claim 4,
wherein the predefined energy limits includes a minimum or maximum predefined energy content limit of the energy storage system, and
the method further comprises in the working mode,
comparing the monitored energy content of the energy storage system with the minimum or maximum predefined energy content limit of the energy storage system.

10. The method according to claim 4,
wherein the predefined power limits is defined by a maximum discharge power and a maximum charge power the energy storage system is able to provide to the electric grid, and
the comparing of the total power demand with the predefined power limits includes comparing the calculated total power demand with the maximum discharge power and with the maximum charge power of the energy storage system.

11. The method according to claim 4, further comprising in the working mode:
determining whether the energy storage system is blocked by determining whether the energy storage system is not able to be operated according to at least one energy service; and
determining at least one energy service according to which the energy storage system is operated to de-block the energy storage system, in case that the energy storage system is blocked.

12. A control apparatus for controlling an energy storage system to be connected to an electric grid, comprising a processor, a memory, and communications circuitry, the processor being configured to:
determine at least two different energy services according to which the energy storage system is to be operated;
operate the same energy storage system according to, in parallel, the two different energy services to provide, from the energy storage system to the electric grid, total power associated with the two different energy services; and
decrease provision of low-priority power associated with at least one of the two different energy services in an ascending order of priority to adjust the total power to a predefined power limits of the energy storage system, in case that the total power does not lie within the predefined power limits,
wherein the two different energy services are prioritized using a descending order of Return on Investment (RoI) as a descending order of priority.

13. The control apparatus according to claim 12,
wherein the processor operates the energy storage system according to at least one of the two different energy services in a descending order of priority, in case that total power does not lie within the predefined power limits.

14. The control apparatus according to claim 12,
wherein the processor stops the provision of the low-priority power, in case that the total power is beyond an adjustable range in which the total power is adjusted to the predefined power limits.

15. An energy storage system comprising at least one storage battery and a control apparatus according to claim 12.

* * * * *